United States Patent
Seo et al.

(10) Patent No.: US 7,953,030 B2
(45) Date of Patent: May 31, 2011

(54) METHOD AND APPARATUS FOR CONTROLLING POWER CONSUMPTION OF STATIONS ON A CSMA/CA-BASED WIRELESS LAN

(75) Inventors: Chang-woo Seo, Suwon-si (KR); Jin-youn Cho, Seoul (KR); Kyung-hun Jang, Suwon-si (KR); Jin-bong Chang, Daejeon-si (KR); Hyo-sun Hwang, Seoul (KR); Sang-hyun Woo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1312 days.

(21) Appl. No.: 10/899,130

(22) Filed: Jul. 27, 2004

(65) Prior Publication Data
US 2005/0025106 A1   Feb. 3, 2005

(30) Foreign Application Priority Data
Jul. 28, 2003   (KR) .............................. 10-2003-52132

(51) Int. Cl.
*G08C 17/00* (2006.01)
(52) U.S. Cl. ........ 370/311; 370/318; 370/328; 455/574; 713/324; 340/7.32
(58) Field of Classification Search ............... 370/318, 370/311, 338, 278, 392; 455/13.4, 522, 571–574, 455/127.1, 127.5, 343.1–343.6, 260, 255, 455/258, 259, 262, 265; 331/16, 17, 103; 342/357.1; 701/213, 214; 375/316, 215, 375/294, 327, 373, 376; 713/320, 324; 340/870.02, 340/7.32
See application file for complete search history.

(56) References Cited

U.S. PATENT DOCUMENTS

| | | | | |
|---|---|---|---|---|
| 5,371,734 A | * | 12/1994 | Fischer | 370/311 |
| 5,438,329 A | * | 8/1995 | Gastouniotis et al. | 340/870.02 |
| 5,559,804 A | | 9/1996 | Amada et al. | |
| 5,790,946 A | * | 8/1998 | Rotzoll | 455/343.1 |

(Continued)

FOREIGN PATENT DOCUMENTS

JP   06-311160   11/1994

(Continued)

OTHER PUBLICATIONS

Cano, J-C., et al., "Evaluating the Energy-Consumption Reduction in a MANET by Dynamically Switching-off Network Interfaces", Computers and Communications, 2001, Proceedings, 6th IEEE Symposium, pp. 186-191, (Jul. 3-5, 2001).

(Continued)

*Primary Examiner* — Aung S Moe
*Assistant Examiner* — Vinncelas Louis
(74) *Attorney, Agent, or Firm* — Lee & Morse, P.C.

(57) ABSTRACT

A method and apparatus controls power consumption of stations having a hierarchical structure when the stations transmit and receive a wireless signal to and from one another on a CSMA/CA wireless LAN. The controlling involves extracting information on frame transmission speed and transmission period information on first and second layers of the hierarchical structure from the wireless signal; determining a power-controlled period for each of the first and second layers based on the extracted information; and reducing the power consumption of the first and second layers by switching a current mode of the first and second layers to a predetermined mode for the power-controlled period if a reception address included in the extracted information is not identical to an address of the station.

14 Claims, 7 Drawing Sheets

U.S. PATENT DOCUMENTS

| | | | |
|---|---|---|---|
| 5,805,990 A | 9/1998 | Ohki | |
| 6,058,289 A * | 5/2000 | Gardner et al. | 340/7.32 |
| 6,104,340 A * | 8/2000 | Krasner | 342/357.1 |
| 6,580,700 B1 | 6/2003 | Pinard et al. | |
| 7,257,095 B2 * | 8/2007 | Liu | 370/311 |
| 7,263,105 B2 * | 8/2007 | Trainin | 370/445 |
| 7,278,039 B1 * | 10/2007 | Lo | 713/320 |
| 7,295,115 B2 * | 11/2007 | Aljadeff et al. | 340/572.1 |
| 7,346,017 B2 * | 3/2008 | Huckins et al. | 370/311 |
| 7,403,511 B2 * | 7/2008 | Liang et al. | 370/338 |
| 2004/0022225 A1 | 2/2004 | Liang et al. | |
| 2004/0029620 A1 * | 2/2004 | Karaoguz | 455/574 |
| 2004/0190467 A1 * | 9/2004 | Liu et al. | 370/311 |
| 2004/0264600 A1 * | 12/2004 | Kao et al. | 375/316 |
| 2005/0009578 A1 * | 1/2005 | Liu | 455/574 |
| 2007/0036096 A1 * | 2/2007 | Sinivaara | 370/318 |

FOREIGN PATENT DOCUMENTS

| | | |
|---|---|---|
| JP | 08-181702 | 7/1996 |
| JP | 2002-290547 | 10/2002 |
| JP | 2003-187517 | 7/2003 |
| WO | WO 01/47188 | 6/2001 |

OTHER PUBLICATIONS

"A proposal for MAC Improvements for fairness and power saving", Project: IEEE P802.15 Working Group for Wireless Personal Area Networks (WPANS), pp. 1-16 (Feb. 8, 2001).

"Draft Supplement to Standard for Telecommunications and Information Exchange between Systems—LAN/MAN Specific Requirements—Part 11 Wireless Medium Access Control (MAC) and Physical Layer (PHY) Specifications: Medium Access Control Enhancements" IEEE Draft Standards, pp. 1-145 (May 2002).

\* cited by examiner

METHOD AND APPARATUS FOR CONTROLLING POWER CONSUMPTION OF STATIONS ON A CSMA/CA-BASED WIRELESS LAN

BACKGROUND OF THE INVENTION

1. Field of the Invention

The present invention relates to a method and apparatus for controlling power consumption of stations on a carrier sense multiple access/collision avoidance (CSMA/CA)-based wireless local area network (LAN). More particularly, the present invention relates to a method and apparatus for controlling the power consumption of stations in a CSMA/CA-based wireless LAN system when the stations are in a standby mode for receiving a wireless signal from each other.

2. Description of the Related Art

Wireless local area network (LAN) systems based on the IEEE 802.11 standard employ carrier sense multiple access/collision avoidance (CSMA/CA) to share a wireless medium with one another. FIG. 1 illustrates a schematic diagram of a wireless LAN system based on the IEEE 802.11 standard. Referring to FIG. 1, the wireless LAN system includes a basic service set (BSS) 10, the Internet 11, and a content server 12.

The BSS 10 includes a wireless terminal 101 and an access point (AP) 102. The wireless terminal 101, which is a type of subscriber terminal requesting wireless LAN services, is called a station. The AP 102 is connected to a wired network, such as the Internet 11, or is wired, via a distribution system (DS), to another AP (not shown) that constitutes another BSS, allowing the AP 102 to bridge the Internet 11 and another network.

The station, i.e., the wireless terminal 101, has a hierarchical structure shown in FIG. 2. Referring to FIG. 2, the station includes a radio frequency (RF) layer 20, a baseband layer 21, and a media access control (MAC) layer 22. Here, the RF layer 20 and the baseband layer 21 are called physical layers.

The MAC layer 22 receives carrier sense information from the physical layers, i.e., the RF layer 20 and the baseband layer 21, and determines, based on the received carrier sense information, whether a wireless medium is currently being used before transmitting a frame to a receiving station. If the wireless medium is in an idle state, a sending station transmits the frame to the receiving station. All stations within a propagation range of the sending station can determine whether the wireless medium is being used when the frame is transmitted thereto by referring to a duration field value of the frame. Writing the time of use of the wireless medium into a frame and transmitting the frame is called virtual carrier sensing.

This process is illustrated in FIG. 3A. As can be seen in FIG. 3A, a receiving station A receives a data frame from a sending station B and transmits an acknowledgement (ACK) frame to the sending station B.

Since wireless LAN systems are mainly employed in portable or mobile devices, battery power is an important issue to be considered. Current wireless LAN systems consume about 80% or more of their energy while performing operations on the physical layers.

In order to minimize power consumption, stations have adopted a power management program allowing them to operate with reduced power consumption. The power management program is used in an infrastructure network using the AP 102. Power management of the stations can be carried out every predetermined number of beacon cycles using the power management program. Each beacon cycle lasts for an average of 100 msec. During the exchange of power management frames in a network, the AP 102 needs to buffer the power management frames, which makes it impossible to control power of the station at less than every 100 msec. Therefore, if a station consumes too much power during a real-time bi-directional service, e.g., a voice/video call, it cannot properly provide the real-time bi-directional service.

FIG. 3B is a timing diagram illustrating a virtual carrier sense operation performed by stations in a wireless LAN environment. Referring to FIG. 3B, first through third stations STA-1, STA-2, and STA-3 and other stations periodically perform virtual carrier sense operations to share a wireless medium. For example, when the first station STA-1 transmits (30) a data frame to the third station STA-3, the second station STA-2 and the other stations, which are not the target stations for the data frame, perform a virtual carrier sense operation (31). This virtual carrier sense operation (31) results in the second station STA-2 and the other stations consuming as much power as the third station STA-3. In response to the receipt of the data frame, the third station STA-3 transmits (32) an ACK frame, which indicates that no error has occurred in the received data frame, to the first station STA-1. The second station STA-2 and the other stations also perform a virtual carrier sense operation (33). Therefore, each of the second station STA-2 and the other stations unnecessarily consumes as much power as the first station STA-1 does.

Stations constituting a wireless LAN system consume power when transmitting and receiving frames to and from one another or carrying out a virtual carrier sense operation. Each of the stations consumes 30-50% more power when transmitting a frame than when receiving a frame. In addition, each of the stations consumes power only for transmitting a frame after performing a carrier sense operation. When performing the carrier sense operation, each of the stations consumes as much power as they consume for receiving a frame. When a plurality of stations shares a wireless medium, however, each station consumes more power when performing a virtual carrier sense operation than when transmitting a frame. For example, if twenty or more stations share a single wireless medium for a predetermined amount of time, they consume at least ten times more power when performing a virtual carrier sense operation than when transmitting a frame. Therefore, in a wireless network structure, such as a hot spot, in which a plurality of stations is served by one AP, the plurality of stations consume most of their power performing a virtual carrier sense operation. Consequently, it is necessary to reduce power consumption of the plurality of stations consumed when the plurality of stations perform a virtual carrier sense operation.

SUMMARY OF THE INVENTION

The present invention is therefore directed to a method and an apparatus, which substantially overcomes one or more of the problems due to the limitations and disadvantages of the related art.

It is a feature of an embodiment of the present invention to provide a method and an apparatus that reduce power consumed by stations when carrying out a virtual carrier sense operation.

It is another feature of an embodiment of the present invention to provide a method and an apparatus that power down all elements of each of the stations, other than those elements needed for stabilizing each of the stations, after power is applied to each of the stations.

It is yet another feature of an embodiment of the present invention to provide a method and an apparatus controlling the power consumption of a station when it receives a wireless signal using a hierarchical structure.

At least one of the above and other features and advantages of the present invention may be realized by providing a method of controlling power consumption of a station when it receives a wireless signal using a hierarchical structure having first and second layers. The method includes extracting information on frame transmission speed and transmission period information on the first and second layers from the wireless signal, determining a power-controlled period for each of the first and second layers based on the extracted information, and reducing power consumption of the first and second layers by switching an original mode of the first and second layers to a predetermined mode for the power-controlled period if a reception address included in the extracted information is not identical to an address of the station.

In the predetermined mode, selected elements of the first and second layers, which require less time to be stabilized after being powered than other elements of the first and second layers, may be powered down. The power-controlled period for each of the first and second layers may be counted down, the first layer may be returned to its original mode when the power-controlled period for the first layer is over; and the second layer may be returned to its original mode when the power-controlled period for the second layer is over. After the power-controlled period is over, the first layer may be returned to its original mode before the second layer is returned to its original mode. If the reception address included in the excluded information is identical to the address of the station, the station may receive the wireless signal via the first and second layers.

At least one of the above and other features of the present invention may be realized by providing an apparatus for controlling the power consumption of a station when it receives a wireless signal using a hierarchical structure. The apparatus includes a first layer of the hierarchical structure for converting the wireless signal into a baseband signal, a second layer of the hierarchical structure for restoring an original signal from the baseband signal, and a received power controller, which reduces the power consumed by the first and second layers by switching an original mode of the first and second layers to a predetermined mode when a reception address included in the restored original signal is not identical to an address of the station.

The first layer may include a signal processor, which converts the wireless signal into the baseband signal, a reference frequency provider, which provides the signal processor with a reference frequency, and a first register, which stores data necessary for the operation of the signal processor. The received power controller may supply power only to the reference frequency provider and the first register in the predetermined mode.

The second layer may include an analog-to-digital converter, which converts the baseband signal into a digital signal, a baseband signal processor, which restores the original signal from the digital signal, and a second register, which stores data necessary for the operation of the analog-to-digital converter or the baseband signal processor. The received power controller may supply power only to the second register in the predetermined mode.

The received power controller may determine a power-controlled period for each of the first and second layers based on the restored original signal and may switch the original mode of the first and second layers to the predetermined mode during the power-controlled period. The first layer may be restored to its original mode before the second layer is restored to its original mode

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
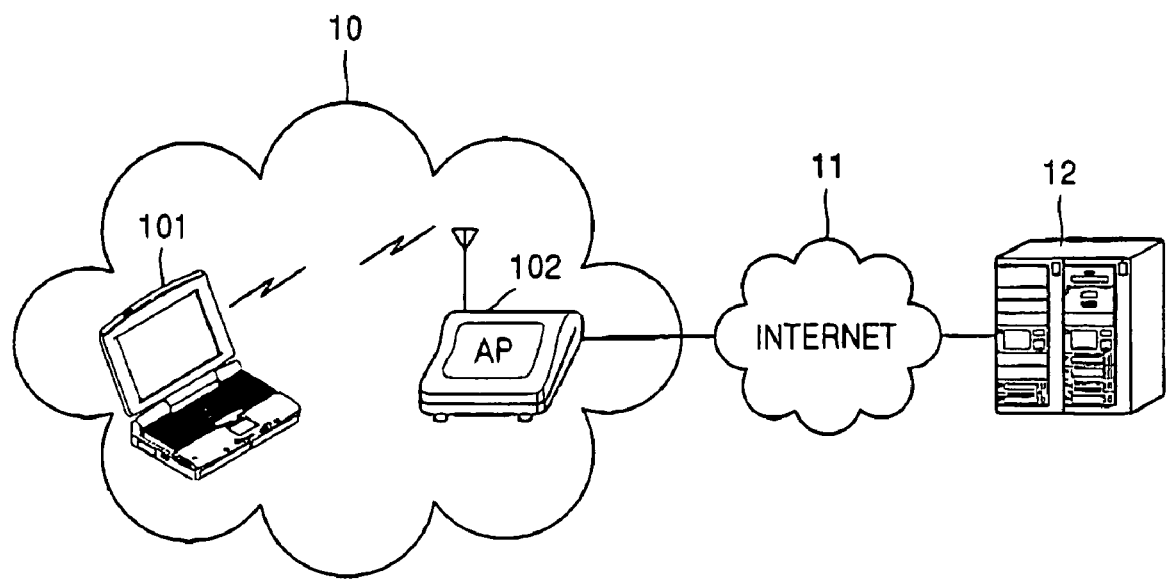
FIG. 1 illustrates a typical wireless LAN system.
Figure 2:
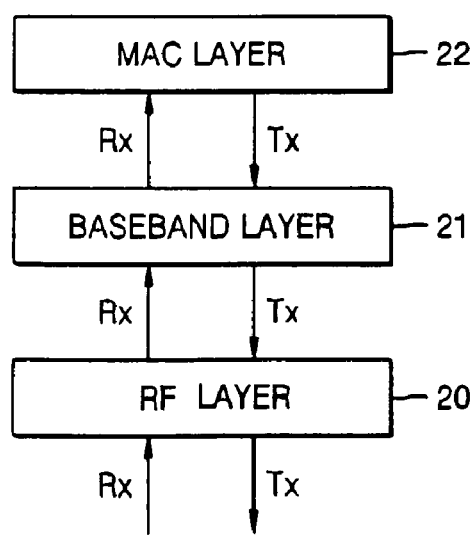
FIG. 2 illustrates a diagram of a hierarchical structure of a station of FIG. 1.
Figure 3A:
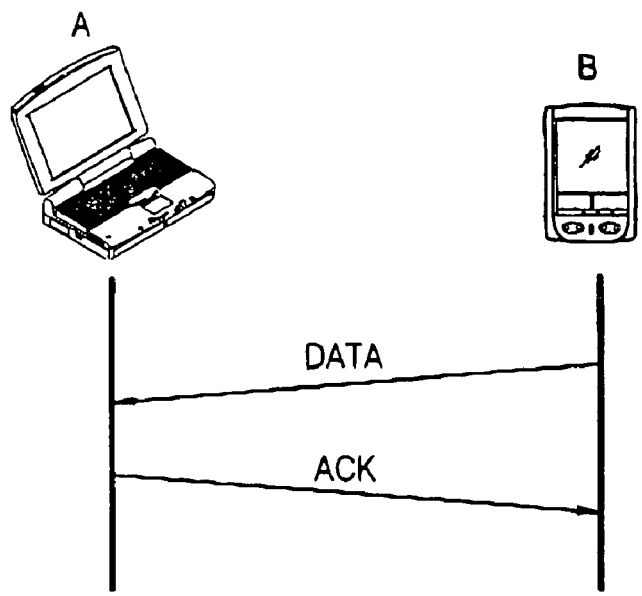
FIG. 3A illustrates transmission of data and an acknowledgement (ACK) frame between two stations.
Figure 3B:
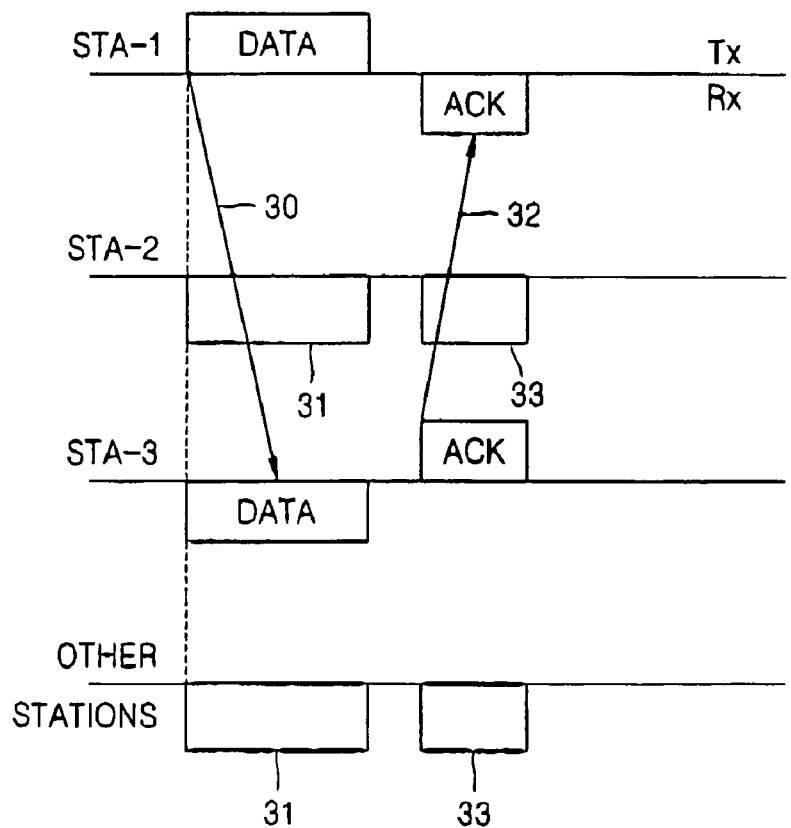
FIG. 3B is a timing diagram illustrating a carrier sense operation performed by stations in a wireless LAN environment.

Korean Patent Application No. 2003-52132, filed on Jul. 28, 2003, in the Korean Intellectual Property Office, and entitled "Method and Apparatus for Controlling Power Consumption of Stations on CSMA/CA-Based Wireless LAN," is incorporated by reference herein in its entirety.

The present invention will now be described more fully with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 4:
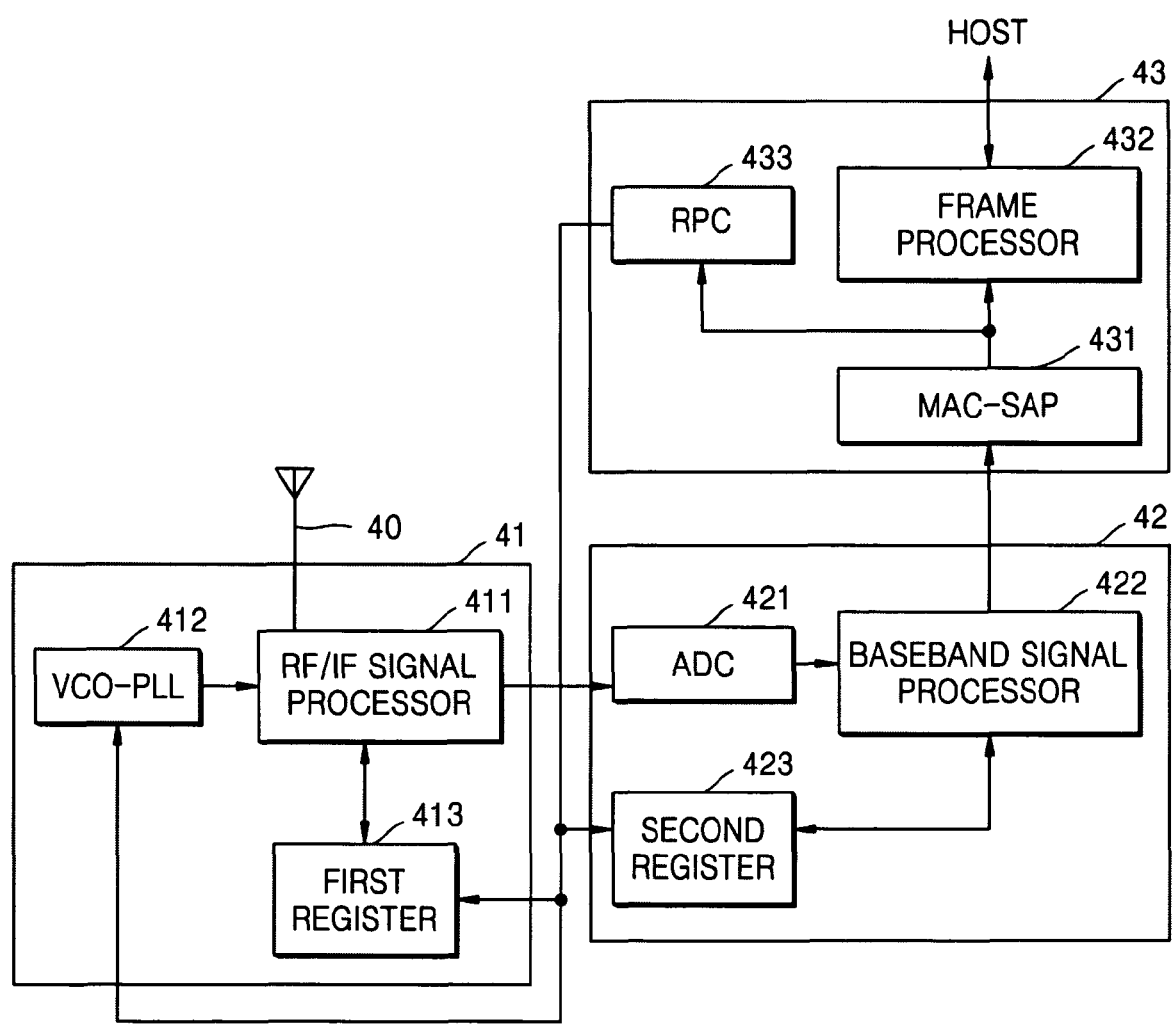
FIG. 4 illustrates a block diagram of a hierarchical structure of a station according to an embodiment of the present invention.

FIG. 4 illustrates a block diagram illustrating a hierarchical structure of a station according to an embodiment of the present invention. Referring to FIG. 4, the hierarchical structure of the station includes a radio frequency (RF) layer 41, a baseband layer 42, and a media access control (MAC) layer 43. The RF layer 41 includes an RF/IF signal processor 411, a voltage controlled oscillator-phase locked loop (VCO-PLL) 412, and a first register 413. The RF/IF signal processor 411 receives an RF signal via an antenna 40, converts the received RF signal into an intermediate frequency (IF) signal, and converts the IF signal into a baseband signal. The VCO-PLL 412 provides a reference frequency to the RF/IF signal processor 411. The first register 413 stores data necessary for the operation of the RF/IF signal processor 411 and provides the data to the RF/IF signal processor 411.

The baseband layer 42 includes an analog-to-digital converter (ADC) 421, a baseband signal processor 422, and a second register 423. The ADC 421 converts the baseband signal output from the RF/IF signal processor 411 into a digital signal. The baseband signal processor 422 demodulates the digital signal output from the ADC 421 using a demodulation method, e.g., a frequency-shift keying (FSK) method, thereby recovering the original signal. The second register 423 stores data necessary for the operation of the baseband signal processor 422, and provides the data to the baseband signal processor 422.

The MAC layer 43 includes a MAC service access point (SAP) 431, a received power controller 433, and a frame processor 432. The MAC SAP 431 receives frames from the baseband signal processor 422. The received power controller 433 controls power of the station based on frames received from the MAC SAP 431. The frame processor 432 communicates with a host by performing protocol control or direct memory access.

Figure 5:
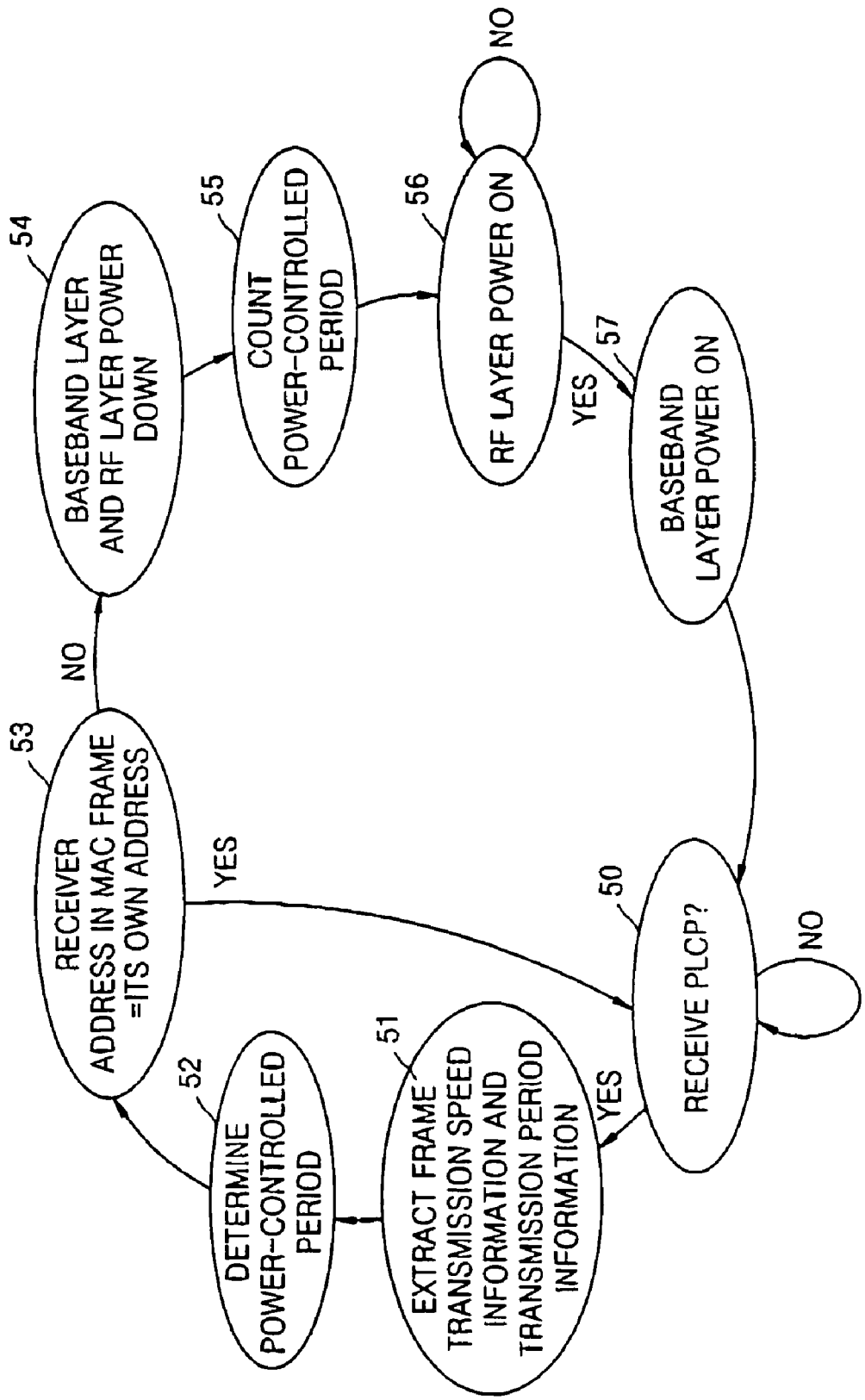
FIG. 5 illustrates a flow of a method of controlling power of stations according to an embodiment of the present invention.

When receiving a signal, power of the station may be controlled in the following manner. FIG. 5 is a diagram illustrating a method of controlling power according to an embodiment of the present invention. More specifically, FIG. 5 illustrates the operation of the received power controller 433.

Figure 6:
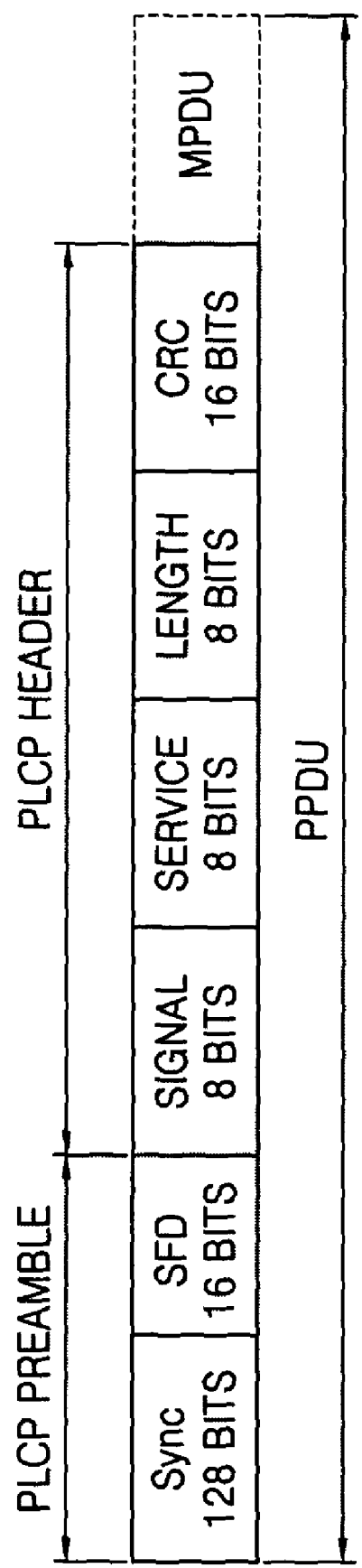
FIG. 6 illustrates a format of a physical layer convergence procedure (PLCP) protocol data unit.

Referring to FIG. 5, the received power controller 433 receives a physical layer conversion protocol (PLCP) frame and a MAC frame via the MAC SAP 431 in step 50. The PLCP frame and the MAC frame include various information, including header information and MAC frame transmission speed information. FIG. 6 illustrates the structure of a PLCP data unit (PPDU). Referring to FIG. 6, the PPDU includes a PLCP preamble, a PLCP header, and a MAC sublayer protocol data unit (MPDU). In FIG. 6, a synchronization field (sync) is used for obtaining and synchronizing incoming signals, and a start-of-frame-delimiter field (SFD) includes information indicating a beginning point in the PPDU. A signal field (SIGNAL) indicates an adopted modulation scheme, and a service field (SERVICE) is a reserved field. A length field (LENGTH) indicates an amount of time required to transmit the MPDU, and a cyclical redundancy check (CRC) field has a frame check sequence (FCS) value calculated by a transmitting station. The PLCP preamble and the PLCP header can be transmitted at a speed of 1 Mbps, and the MPDU can be transmitted at a speed of 1 or 2 Mbps.

In step 51, the received power controller 433 extracts transmission speed information and frame transmission period information from the information received in step 50. In step 52, the received power controller 433 determines a power-controlled period by interpreting the extracted information. The frame transmission period information can be obtained from a duration field of each MAC frame.

Figure 7A:
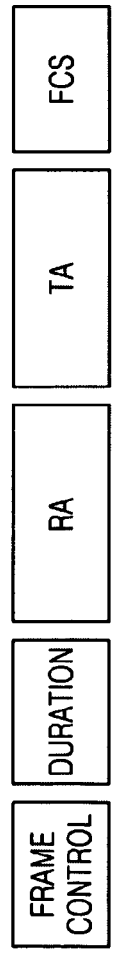
FIGS. 7A through 7C illustrate diagrams of formats of media access control (MAC) frames.
Figure 7B:
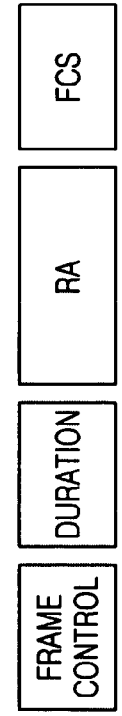
Figure 7C:

FIGS. 7A through 7C illustrate different examples of MAC frames. More specifically, FIG. 7A illustrates a structure of a request-to-send (RTS) frame, FIG. 7B illustrates a structure of a clear-to-send (CTS) frame, and FIG. 7C illustrates a structure of a data frame. In FIGS. 7A through 7C, RA represents a reception address, and TA represents a transmission address. In FIG. 7C, ADDRESSES 1 through 4 are address fields, which can be respectively classified as one of a transmission address, a reception address, and a group address.

A power-controlled period for the baseband layer 42 is calculated independently of a power-controlled period for the RF layer 41 because the time taken for the baseband layer 42 to stabilize differs from the time taken for the RF layer 41 to stabilize. For example, currently, it takes the baseband layer 42 no more than five microseconds to stabilize, while it takes the RF layer 41 no more than ten microseconds to stabilize.

Once the power-controlled period of the baseband layer 42 and the RF layer 42 is determined, the received power controller 433 compares its address with a reception address of the received MAC frame in step 53. If the reception address of the received MAC frame is identical to the address of the received power controller 433, the method returns to step 50, a PLCP is continuously received, and the frame processor 432 performs an operation. If the reception address of the received MAC frame is different from the address of the received power controller 433 in step 53, the received power controller 433 switches current modes of the baseband layer 42 and the RF layer 41 to low power modes in step 54 for the duration of the power-controlled period determined in step 52.

When the baseband layer 42 is in a low power mode, all the elements thereof except for the second register 423 are powered down and clocks provided thereto are all blocked. When the RF layer 41 is in the low power mode, all the elements thereof, except for the VCO-PLL 412 and the first register 413, are powered down. The first and second registers 413 and 423 and the VCO-PLL 412 are preferably continuously supplied with power because they require more time to stabilize after they are powered up than the rest of the baseband layer 42 and the RF layer 41.

When power is cut off, the received power controller 433 counts the power-controlled period in step 55. When the power-controlled period of the RF layer 41 is finished, the received power controller 433 applies power to the RF layer 41 so that the RF layer 41 can be switched from the low power mode to a normal operational mode in step 56. Once the RF layer 41 is powered up, it stabilizes within ten microseconds.

When the RF layer 41 returns to the normal operational mode and the power-controlled period of the baseband layer 42 is over, the received power controller 433 applies power to the baseband layer 42 so that the baseband layer 42 can be switched from the low power mode to the normal operational mode in step 57. Once the baseband layer 42 is powered up, it stabilizes within five microseconds.

Thereafter, the method returns to step 50, in which the received power controller 433 continuously receives a PLCP, and the receiving station performs a virtual carrier sense operation.

Figure 8:
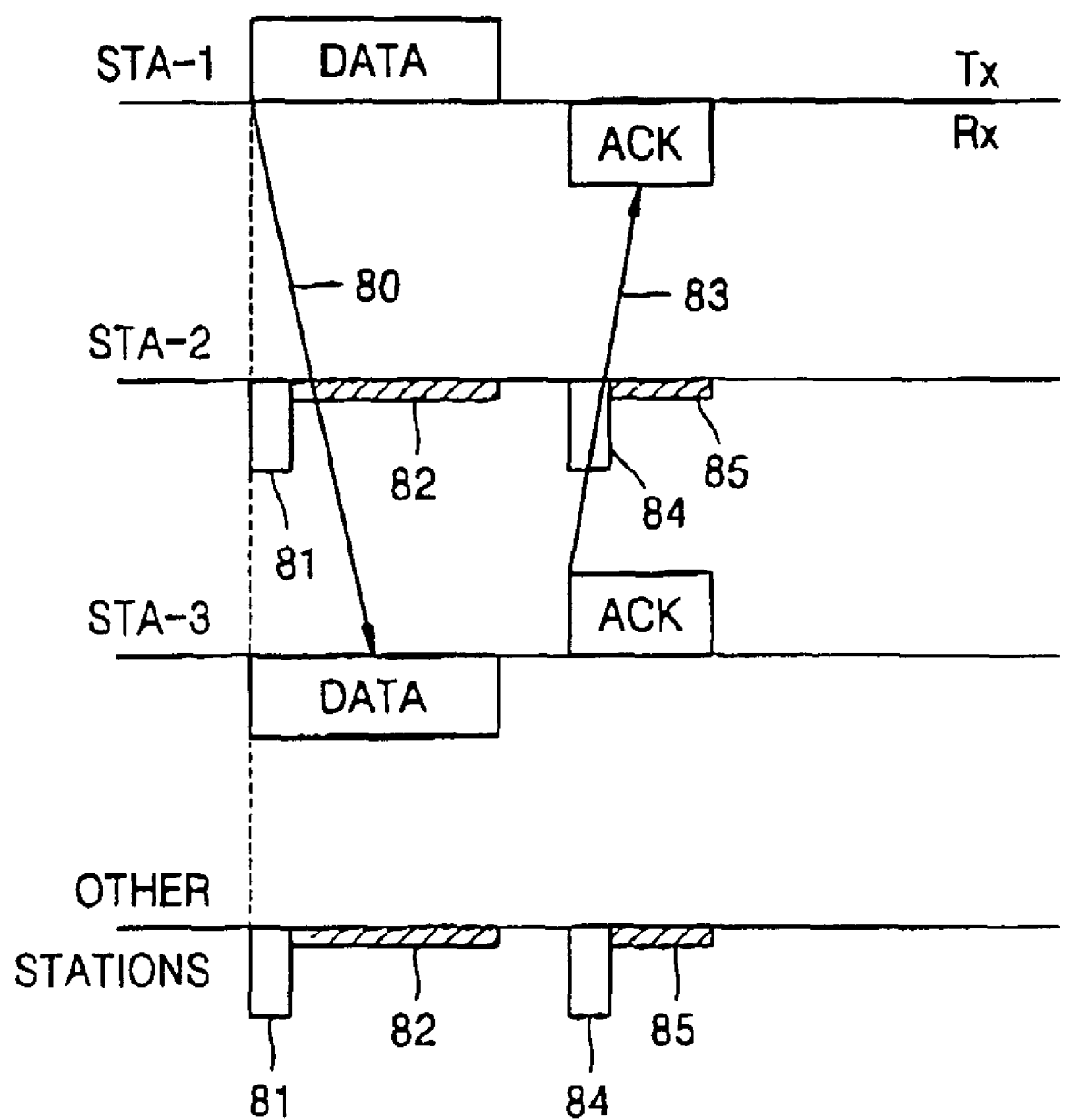
FIG. 8 illustrates power consumption of stations when performing a carrier sense operation using a method of controlling power consumption of stations according to an embodiment of the present invention.

FIG. 8 illustrates power consumption of stations when performing a carrier sense operation using a method of controlling power consumption of stations according to an embodiment of the present invention. Referring to FIG. 8, when a first station STA-1 transmits (80) a MAC frame (DATA) to a third station STA-3, a second station STA-2 and other stations, in addition to the third station STA-3, perform a carrier sense operation (81) so that they consume as much power as the third station STA-3. However, once the second station STA-2 and the other stations determine that the MAC frame is not directed thereto, each layer therein is shifted to a low power mode (82). When the third station STA-3 transmits (83) an ACK frame to the first station STA-1, the second station STA-2 and the other stations also perform a virtual carrier sense (84). However, once the second station STA-2 and the other stations determine that the ACK frame is not directed thereto, each layer therein is again shifted to a low power mode (85).

The method of controlling the power consumption of stations according to an embodiment of the present invention was simulated under a circumstance where two stations and an AP were used in an Internet environment with some traffic. Simulation results indicate that the power consumption of stations in the present invention can be reduced to 30-50% of the power consumption of conventional stations.

According to the present invention, it is possible to control the power consumption of stations in a hardware manner while the stations perform a carrier sense operation. Thus, it is possible to minimize the power consumption of the stations in a bi-directional real-time communication service. The present invention complies with the IEEE 802.11 standard, and thus it can be readily applied to IEEE 802.11 wireless LAN systems. If the present invention is applied to a structure, into which a MAC layer, a baseband layer, and an RF layer are integrated in a silicon-on-chip manner, power conservation can be maximized. In addition, the present invention can be easily applied to field programmable gate arrays (FPGAs) or digital signal processors (DSPs).

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims

What is claimed is:

1. A method of controlling power consumption of a station when it receives a wireless local area network signal using a hierarchical structure having a first layer and a second layer, the method comprising:
    extracting information on frame transmission speed and transmission period information on the first and second layers from the wireless signal;
    determining a power-controlled period for each of the first and second layers based on the extracted information;
    reducing the power consumption of the first and second layers by switching an original mode of the first and second layers to a predetermined mode during the power-controlled period if a reception address included in the extracted information is not identical to an address of the station; and
    maintaining the power consumption of the first and second layers at the original mode only when the reception address included in the extracted information is identical to the address of the station,
    wherein the first layer is an RF layer and the second layer is a baseband layer, and
    wherein in the predetermined mode, all the elements of the RF layer except for a PLL (Phase Locked Loop) and a first register are powered down and all the elements of the baseband layer except for a second register are powered down.

2. The method as claimed in claim 1, further comprising:
    counting the power-controlled period for each of the first and second layers;
    returning the first layer to its original mode if the power-controlled period for the first layer is over; and
    returning the second layer to its original mode if the power-controlled period for the second layer is over.

3. The method as claimed in claim 1, further comprising, after the power-controlled period is over:
    returning the first layer to its original mode; and
    returning the second layer to its original mode after the first layer is returned to its original mode.

4. The method as claimed in claim 1, wherein if the reception address included in the excluded information is identical to the address of the station, the station receives the wireless signal via the first and second layers.

5. The method as claimed in claim 1, further comprising determining, after determining the power-controlled period, whether the reception address included in the extracted information is identical to the address of the station.

6. The method as claimed in claim 1, wherein, in the predetermined mode, selected elements of the first and second layers, which require less time to be stabilized after being powered than other elements of the first and second layers.

7. An apparatus for controlling power consumption of a station when it receives a wireless local area network signal using a hierarchical structure, the apparatus comprising:
    a first layer of the hierarchical structure, the first layer for converting the wireless signal into a baseband signal;
    a second layer of the hierarchical structure, the second layer for restoring an original signal from the baseband signal; and
    a received power controller, which determines a power-controlled period for each of the first and second layers and reduces the power consumed by the first and second layers during the power-controlled period by switching an original mode of the first and second layers to a predetermined mode when a reception address included in the restored original signal is not identical to an address of the station, and maintaining the power consumption of the first and second layers at the original mode only when the reception address is identical to the address of the station,
    wherein the first layer is an RF layer and the second layer is a baseband layer, and
    wherein in the predetermined mode, all the elements of the RF layer except for a PLL (Phase Locked Loot)) and a first register are powered down and all the elements of the baseband layer except for a second register are powered down.

8. The apparatus as claimed in claim 7, wherein the first layer comprises:
    a signal processor, which converts the wireless signal into the baseband signal;
    a reference frequency provider, which provides the signal processor with a reference frequency; and
    a first register, which stores data necessary for the operation of the signal processor,
    wherein the received power controller supplies power only to the reference frequency provider and the first register in the predetermined mode.

9. The apparatus as claimed in claim 8, wherein the second layer comprises:
    an analog-to-digital converter, which converts the baseband signal into a digital signal;
    a baseband signal processor, which restores the original signal from the digital signal; and
    a second register, which stores data necessary for the operation of the analog-to-digital converter or the baseband signal processor,
    wherein the received power controller supplies power only to the second register in the predetermined mode.

10. The apparatus as claimed in claim 7, wherein the second layer comprises:
    an analog-to-digital converter, which converts the baseband signal into a digital signal;
    a baseband signal processor, which restores the original signal from the digital signal; and
    a second register, which stores data necessary for the operation of the analog-to-digital converter or the baseband signal processor,
    wherein the received power controller supplies power only to the second register in the predetermined mode.

11. The apparatus as claimed in claim 7, wherein the received power controller determines the power-controlled period for each of the first and second layers based on the restored original signal.

12. The apparatus as claimed in claim 11, wherein the first layer is restored to its original mode before the second layer is restored to its original mode.

13. The apparatus as claimed in claim 7, wherein the received power controller determines, after the power-controlled period is determined, whether the reception address included in the restored original signal is identical to the address of the station.

14. The apparatus as claimed in claim 7, wherein, in the predetermined mode, selected elements of the first and second layers, which require less time to be stabilized after being powered than other elements of the first and second layers.

* * * * *